(12) United States Patent
Adzic et al.

(10) Patent No.: US 7,691,780 B2
(45) Date of Patent: Apr. 6, 2010

(54) PLATINUM- AND PLATINUM ALLOY-COATED PALLADIUM AND PALLADIUM ALLOY PARTICLES AND USES THEREOF

(75) Inventors: Radoslav Adzic, East Setauket, NY (US); Junliang Zhang, Stony Brook, NY (US); Yibo Mo, Naperville, IL (US); Miomir Branko Vukmirovic, Port Jefferson Station, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 1504 days.

(21) Appl. No.: 11/019,759

(22) Filed: Dec. 22, 2004

(65) Prior Publication Data

US 2006/0135359 A1 Jun. 22, 2006

(51) Int. Cl.
*B22F 1/02* (2006.01)
*H01M 4/92* (2006.01)
(52) U.S. Cl. .................... 502/339; 429/44
(58) Field of Classification Search ............ 429/44, 429/13, 17, 40, 231.8; 428/570, 403, 694; 502/339, 102, 103, 104, 223, 326, 101, 182, 502/527.15, 527.24; 427/115
See application file for complete search history.

(56) References Cited

U.S. PATENT DOCUMENTS

| | | |
|---|---|---|
| 3,340,097 A | 9/1967 | Hess et al. |
| 3,645,860 A | 2/1972 | Fishman et al. |
| 3,857,737 A | 12/1974 | Kemp et al. |
| 3,977,901 A | 8/1976 | Buzzelli |
| 4,031,292 A | 6/1977 | Hervert |
| 4,388,383 A | 6/1983 | Heller |
| 4,426,269 A | 1/1984 | Brown et al. |
| 4,716,087 A | 12/1987 | Ito et al. |
| 4,794,054 A | 12/1988 | Ito et al. |
| 4,822,699 A | 4/1989 | Wan |
| 5,024,905 A | 6/1991 | Itoh et al. |
| 5,132,193 A | 7/1992 | Reddy et al. |
| 5,202,299 A | 4/1993 | Symons et al. |
| 5,208,207 A | 5/1993 | Stonehart et al. |

(Continued)

FOREIGN PATENT DOCUMENTS

EP 0 617 439 A2 9/1994

(Continued)

OTHER PUBLICATIONS j. Zhang, et al., J. Phys. Chem. B., 108: 10955-10964 (2004).*

(Continued)

*Primary Examiner*—Patrick Ryan
*Assistant Examiner*—Monique Wills
(74) *Attorney, Agent, or Firm*—Dorene M. Price

(57) ABSTRACT

The present invention relates to particle and nanoparticle composites useful as oxygen-reduction electrocatalysts. The particle composites are composed of a palladium or palladium-alloy particle or nanoparticle substrate coated with an atomic submonolayer, monolayer, bilayer, or trilayer of zerovalent platinum atoms. The invention also relates to a catalyst and a fuel cell containing the particle or nanoparticle composites of the invention. The invention additionally includes methods for oxygen reduction and production of electrical energy by using the particle and nanoparticle composites of the invention.

24 Claims, 5 Drawing Sheets

U.S. PATENT DOCUMENTS

| | | | |
|---|---|---|---|
| 5,225,391 | A | 7/1993 | Stonehart et al. |
| 5,470,673 | A | 11/1995 | Tseung et al. |
| 5,683,829 | A | 11/1997 | Sarangapani |
| 5,702,836 | A | 12/1997 | Ma et al. |
| 5,759,944 | A | 6/1998 | Buchanan et al. |
| 5,795,669 | A | 8/1998 | Wilkinson et al. |
| 5,804,325 | A | 9/1998 | Yepez |
| 5,922,487 | A | 7/1999 | Watanabe et al. |
| 6,007,934 | A | 12/1999 | Auer et al. |
| 6,183,894 | B1 | 2/2001 | Adzic et al. |
| 6,194,338 | B1 | 2/2001 | Andolfatto et al. |
| 6,200,457 | B1 | 3/2001 | Durand et al. |
| 6,232,264 | B1 | 5/2001 | Lukehart et al. |
| 6,284,402 | B1 | 9/2001 | Mallouk et al. |
| 6,326,098 | B1 | 12/2001 | Itoh et al. |
| 6,498,121 | B1 | 12/2002 | Gorer |
| 6,528,020 | B1 | 3/2003 | Dai et al. |
| 6,548,168 | B1 | 4/2003 | Mulvaney et al. |
| 6,585,947 | B1 | 7/2003 | Nayfeh et al. |
| 6,670,301 | B2 | 12/2003 | Adzic et al. |
| 6,749,892 | B2 | 6/2004 | Chang |
| 6,783,569 | B2 | 8/2004 | Cheon et al. |
| 7,205,255 | B2 * | 4/2007 | Yamamoto .................. 502/101 |
| 2001/0002275 | A1 | 5/2001 | Oldenburg et al. |
| 2003/0039860 | A1 * | 2/2003 | Cheon et al. ............. 428/694 T |
| 2003/0068432 | A1 | 4/2003 | Dai et al. |
| 2003/0135971 | A1 | 7/2003 | Lieberman et al. |
| 2004/0055419 | A1 | 3/2004 | Kurihara et al. |
| 2004/0131762 | A1 | 7/2004 | Vigie et al. |

FOREIGN PATENT DOCUMENTS

| | | |
|---|---|---|
| EP | 0 952 241 A1 | 10/1999 |
| EP | 0 850 204 B1 | 12/2001 |
| JP | 54146878 A2 | 11/1979 |
| JP | 11064263 A2 | 3/1999 |
| JP | 21133388 A2 | 5/2001 |
| JP | 23086192 A2 | 3/2003 |
| WO | WO 91/06036 | 5/1991 |

OTHER PUBLICATIONS

J. Zhang, et al, *J. Phys. Chem. B.*, 108: 10955-10964 (2004).
Toda, T., et al, *J. Electroanal. Chem.*, 460: 258-262 (1999).
Paulus, U., et al, *Electrochim. Acta.*, 47: 3787-3798 (2002).
Brankovic, S. R., et al, *Surf. Sci.*, 474: L173-L179 (2001).
Brankovic, S. R., et al, *Electrochem. Solid State Lett..* 4: A217-A220 (2001).
Stamenkovic, V., et al, *J. Phys. Chem. B*, 106: 11970-11979 (2002).
Stamenkovic, V., et al, *J. Electroanal. Chem.*, 554-555: 191-199 (2003).
Peuckert, M., et al, *J. Electrochem. Soc*, 133: 944-947 (1986).
Rodriguez, J. A., et al, *Surf. Sci. Rep.*, 24: 223-287 (1996).
Schmidt, T. J., et al, *Electrochim. Acta.*, 47: 3765-3776 (2002).
Baldauf, M., et al, *J. Phys. Chem.*, 100: 11375-11381 (1996).
Naohara, H., et al, *Electrochim. Acta.*, 45: 3305-3309 (2000).
Meitzner, G., et al, *J. Phys. Chem.*, 96: 4960-4964 (1992).
Mukerjee, S., et al, *J. Electrochem. Soc.*, 142: 1409-1422 (1995).
Toda, T., et al, *J. Electrochem. Soc.*, 145: 4185-4188 (1998).
Sasaki, K., et al, *Electrochim. Acta.*, 48: 3841-3849 (2003).
Buatier de Mongeot, F., et al, *Surf. Sci.*, 411: 249-262 (1998).
Mrosek, M. F., et al, *Anal. Chem.*, 73: 5953-5960 (2001).
Chrzanowski, W., et al, *Langmuir*, 13: 5974-5978 (1997).
Chrzanowski, W., et al, *Catal. Lett.*, 50: 69-75 (1998).
Attard, G. A., et al, *J. Electroanal. Chem.*, 300: 467-485 (1991).
Llorka, M. J., et al, *J. Electroanal. Chem.*, 351: 299-319 (1993).
Zoval, J. V., et al, *J. Phys. Chem. B*, 102: 1166-1175 (1998).
Parsons, R., et al, *J. Electroanal. Chem.*, 257: 9-45 (1988).
Ma, et al, *Mater. Res. Soc. Proc.*, 332: 327-333 (1994).
Kadirgan, F., et al, *J. Electroanal. Chem.*, 125: 89-103 (1981).
Enyo, M., et al, *J. Appl. Electrochem.*, 15: 907-911 (1985).
Koljadko, J., et al, *J. Electroanal. Chem.*, 137:117-125 (1982).
Solla-Gullon, J., et al, *Electrochem. Commun.*, 4 (9): 716-721 (2002).
Brankovic, S. R., et al, *J. Electroanal. Chem.*, 503: 99-104 (2001).
Holmberg, K., *J. Colloid Interface Sci.*, 274: 355-364 (2004).
Penner, R.M., *Acc. Chem. Res.*, 33: 78-86 (2000).
Wang, J. X., et al., *J. Electrochemical Society*, 150 (8): A1108-A1117 (2003).
Wang, J. X., et al., *J. Phys. Chem B*, 150: 4127-4133 (2004).
Uribe, F. A., et al., *Electrochimica Acta*, 47: 3799-3806 (2002).

* cited by examiner

PLATINUM- AND PLATINUM ALLOY-COATED PALLADIUM AND PALLADIUM ALLOY PARTICLES AND USES THEREOF

This invention was made with Government support under contract number DE-AC02-98CH10886, awarded by the U.S. Department of Energy. The Government has certain rights in the invention.

BACKGROUND OF THE INVENTION

The present invention relates to particle composites useful as catalysts, and particularly, oxygen-reducing electrocatalysts in fuel cells. The invention particularly relates to platinum atomic monolayer nanoparticle composites having low platinum loading coupled with high catalytic activity.

A "fuel cell" is a device which converts chemical energy into electrical energy. In a typical fuel cell, a gaseous fuel such as hydrogen is fed to an anode (the negative electrode), while an oxidant such as oxygen is fed to the cathode (the positive electrode). Oxidation of the fuel at the anode causes a release of electrons from the fuel into an external circuit which connects the anode and cathode. In turn, the oxidant is reduced at the cathode using the electrons provided by the oxidized fuel. The electrical circuit is completed by the flow of ions through an electrolyte that allows chemical interaction between the electrodes. The electrolyte is typically in the form of a proton-conducting polymer membrane that separates the anode and cathode compartments and which is also electrically insulating. A well-known example of such a proton-conducting membrane is NAFION®.

A fuel cell, although having components and characteristics similar to those of a typical battery, differs in several respects. A battery is an energy storage device whose available energy is determined by the amount of chemical reactant stored within the battery itself. The battery will cease to produce electrical energy when the stored chemical reactants are consumed. In contrast, the fuel cell is an energy conversion device that theoretically has the capability of producing electrical energy for as long as the fuel and oxidant are supplied to the electrodes.

In a typical proton-exchange membrane (PEM) fuel cell, hydrogen is supplied to the anode and oxygen is supplied to the cathode. Hydrogen is oxidized to form protons while releasing electrons into the external circuit. Oxygen is reduced at the cathode to form reduced oxygen species. Protons travel across the proton-conducting membrane to the cathode compartment to react with reduced oxygen species forming water. The reactions in a typical hydrogen/oxygen fuel cell are as follows:

Anode: $2H_2 \rightarrow 4H^+ + 4e^-$    (1)

Cathode: $O_2 + 4H^+ + 4e^- \rightarrow 2H_2O$    (2)

Net Reaction: $2H_2 + O_2 \rightarrow 2H_2O$    (3)

In many fuel cell systems, a hydrogen fuel is produced by converting a hydrocarbon-based fuel such as methane, or an oxygenated hydrocarbon fuel such as methanol, to hydrogen in a process known as "reforming". The reforming process typically involves the reaction of either methane or methanol with water along with the application of heat to produce hydrogen along with the byproducts of carbon dioxide and carbon monoxide.

Other fuel cells, known as "direct" or "non-reformed" fuel cells, oxidize fuel high in hydrogen content directly, without the hydrogen first being separated by a reforming process. For example, it has been known since the 1950's that lower primary alcohols, particularly methanol, can be oxidized directly. Accordingly, a substantial effort has gone into the development of the so-called "direct methanol oxidation" fuel cell because of the advantage of bypassing the reformation step.

In order for the oxidation and reduction reactions in a fuel cell to occur at useful rates and at desired potentials, electrocatalysts are required. Electrocatalysts are catalysts that promote the rates of electrochemical reactions, and thus, allow fuel cells to operate at lower overpotentials. Accordingly, in the absence of an electrocatalyst, a typical electrode reaction would occur, if at all, only at very high overpotentials. Due to the high catalytic nature of platinum, supported platinum and platinum alloy materials are preferred as electrocatalysts in the anodes and cathodes of fuel cells.

However, a significant obstacle in commercializing fuel cells is the limitation of current platinum oxygen-reducing cathodes. One major problem in current platinum oxygen-reducing cathodes is the slow kinetics of oxygen reduction. In addition, a large loss in potential of 0.3-0.4 volts is typically observed during operation of the fuel cell. This loss in potential is the source of a major decline in the fuel cell's efficiency.

Another problem in existing electrocatalyst technology is the high platinum loading in fuel cell cathodes. Since platinum is a high-cost precious metal, high platinum loading translates to high costs of manufacture.

Accordingly, there have been efforts to reduce the amount of platinum in electrocatalysts. For example, platinum nanoparticles have been studied as electrocatalysts (see, for example, U.S. Pat. Nos. 6,007,934; and 4,031,292). In addition, platinum-alloy nanoparticles, such as platinum-palladium alloy nanoparticles, have been studied (see, for example, U.S. Pat. No. 6,232,264; Solla-Gullon, J., et al, "Electrochemical And Electrocatalytic Behaviour Of Platinum-Palladium Nanoparticle Alloys", Electrochem. Commun., 4, 9: 716 (2002); and Holmberg, K., "Surfactant-Templated Nanomaterials Synthesis", J. Colloid Interface Sci., 274: 355 (2004)).

U.S. Pat. No. 6,670,301 B2 to Adzic et al. relates to an atomic monolayer of platinum on ruthenium nanoparticles. The platinum-coated ruthenium nanoparticles are useful as carbon monoxide-tolerant anode electrocatalysts in fuel cells. See also: Brankovic, S. R., et al., "Pt Submonolayers On Ru Nanoparticles—A Novel Low Pt Loading, High CO Tolerance Fuel Cell Electrocatalyst", Electrochem. Solid State Lett., 4, p. A217 (2001); and Brankovic, S. R., et al, "Spontaneous Deposition Of Pt On The Ru(0001) Surface", J. Electroanal. Chem., 503: 99 (2001), which also disclose platinum monolayers on ruthenium nanoparticles.

However, none of the art discussed above disclose platinum-based electrocatalysts with significantly improved oxygen-reducing catalytic activity in combination with a significant reduction in platinum loading. Accordingly, there is a need for new platinum-based electrocatalysts having these advantages. The present invention relates to such platinum-based electrocatalysts.

SUMMARY OF THE INVENTION

The present invention relates to platinum- and platinum alloy-coated palladium or palladium-alloy particles. The platinum and platinum alloy coatings are atomically thin layers, i.e., atomic submonolayers, monolayers, bilayers, trilayers, or combinations thereof.

When applied as fuel cell electrocatalysts, the particle composites are preferably platinum monolayer- or submonolayer-coated palladium or palladium-alloy particles. The particles are even more preferably nanoparticles.

In one embodiment, an atomic submonolayer of platinum contains only platinum atoms in the absence of other co-deposited metal atoms.

In another embodiment, an atomic submonolayer of platinum atoms includes one or more co-deposited atomic submonolayers of another metal to form a platinum-metal alloy monolayer. The co-deposited metal(s) in the platinum-alloy monolayer may be, for example, a main group, transition, lanthanide, or actinide metal. The co-deposited metal is preferably a transition metal. More preferably, the co-deposited metal is iridium (Ir), ruthenium (Ru), osmium (Os), rhenium (Re), or any combination thereof. Even more preferably, the platinum-metal alloy monolayer is according to the formula $M_{0.2}Pt_{0.8}$, where M is Ir, Ru, Os, or Re. Most preferably, the platinum-metal alloy monolayer is according to the formula $Re_{0.2}Pt_{0.8}$ or $Os_{0.2}Pt_{0.8}$.

The platinum-coated palladium or palladium-alloy nanoparticles preferably have a minimum size of about 3 nanometers and a maximum size of about 10 nanometers. The maximum size of the nanoparticles is preferably no more than about 12 nanometers. The platinum-coated palladium or palladium-alloy nanoparticles most preferably have a size of about 5 nanometers.

One embodiment relates to platinum-coated palladium particles. The platinum-coated palladium particles contain a core composed of zerovalent palladium. The palladium core is coated with a shell of zerovalent platinum.

Another embodiment relates to platinum-coated palladium-alloy particles. The platinum-coated palladium-alloy particles contain a core composed of zerovalent palladium-alloy. The palladium-alloy core is coated with a zerovalent platinum or platinum-alloy shell. Preferably, the alloying component in the palladium-alloy is a metal or combination of metals other than platinum. More preferably, the alloying metal is one or more transition metals. Even more preferably, the alloying metal is one or more 3d transition metals, i.e., the row of transition metals starting with scandium (Sc). Even more preferably, the alloying metals are selected from nickel (Ni), cobalt (Co), iron (Fe), or any combination thereof. Gold (Au), or its combination with other metals, particularly, Ni, Co, and Fe, are other preferred alloying metals.

In one embodiment, the palladium-alloy core is a homogeneous palladium-alloy composition.

In another embodiment, the palladium-alloy core is a heterogeneous palladium-alloy composition. An example of a palladium-alloy particle having a heterogeneous palladium-metal alloy composition is any non-palladium metal inner core coated with a layer of palladium.

When appropriate, the particle and nanoparticle composites as thus far described may also have metal-bonding ligands or surfactants bound to, or associated with, the surface layer of zerovalent platinum. The particle and nanoparticle composites may also be in the form of a suspension or dispersion in a liquid phase. The liquid phase may be any suitable liquid phase such as an organic solvent or an alcohol. Preferably, the liquid phase is aqueous-based. Some examples of suitable aqueous-based liquid phases include water and water-alcohol mixtures.

In one embodiment, the particle composites of the present invention are applied as catalysts, e.g., oxygen reduction catalysts or electrocatalysts. The particle composites may be unsupported, or alternatively, bound to a support. The support may be any suitable support. When applied as fuel cell electrocatalysts, the support is preferably electrically conductive. Some preferred electrically conductive supports include carbon black, graphitized carbon, graphite, or activated carbon.

In another embodiment, the invention relates to a fuel cell. In the fuel cell, the oxygen-reducing cathode contains the platinum-coated palladium or palladium-alloy particle composites bound to an electrically conductive support. The fuel cell additionally contains the other typical elements of a fuel cell, e.g., an anode, a proton-conducting medium that allows chemical contact between the cathode and anode to enable proton exchange, and an electrical contact between the anode and cathode. The fuel cell, as described, becomes operational when the oxygen-reducing cathode is in contact with oxygen gas and the anode is in contact with a fuel source.

Some contemplated fuel sources include, for example, hydrogen gas and alcohols. Some examples of suitable alcohols include methanol and ethanol. The alcohol may be unreformed or reformed. An example of a reformed alcohol is methanol reformate. Examples of other fuels include methane, gasoline, formic acid, and ethylene glycol. The gasoline or methane is preferably reformed to produce fuel more suitable for existing fuel cells.

In another embodiment, the invention relates to a method for reducing oxygen gas. In one embodiment, the method uses the particle composites described above to reduce oxygen gas. The particle composites may be in the form of a solid, or alternatively, dispersed or suspended in a liquid phase when contacting oxygen gas. In another embodiment, the particle composites are bound to a support when reducing oxygen gas.

In yet another embodiment, the invention relates to a method for producing electrical energy. In the method, an oxygen-reducing cathode containing the palladium or palladium-alloy nanoparticle composites of the present invention is contacted with oxygen. Similarly, an anode is contacted with any of the fuel sources described above. The oxygen-reducing cathode is in electrical contact with an anode. The oxygen-reducing cathode and anode are in chemical contact through mutual contact with an ion-conducting medium, preferably a proton-conducting medium.

As a result of the present invention, significantly improved oxygen-reducing catalytic activity in combination with a significant reduction in platinum loading has been made possible.

DETAILED DESCRIPTION OF THE INVENTION

Figure 1:
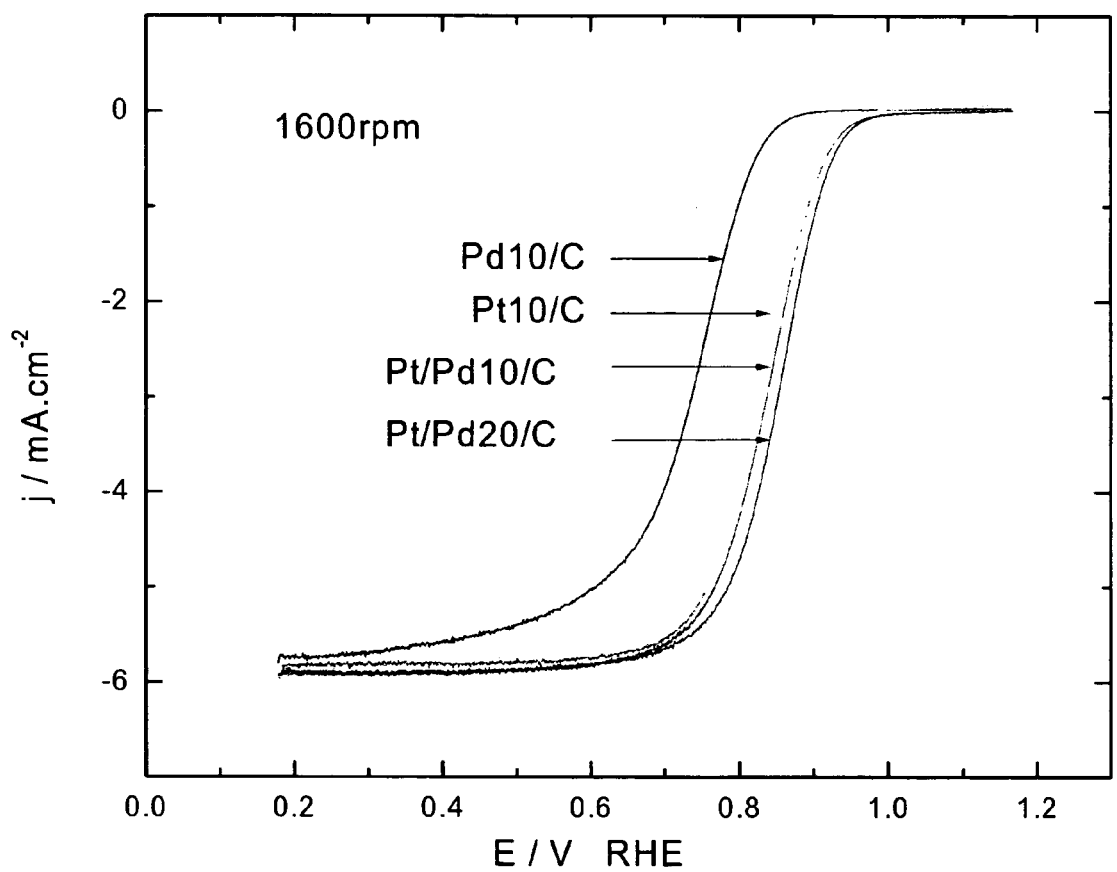
FIG. 1. Comparison of polarization curves for oxygen reduction on palladium nanoparticles, 10 nmol loading (left curve); commercial platinum nanoparticles, 10 nmol loading (second to left curve); and platinum-coated palladium nanoparticles of the present invention, 10 and 20 nmol Pd loadings, (two right curves).

In one embodiment, the invention relates to particle composites having a zerovalent palladium or palladium-alloy core coated with an atomically thin surface layer of zerovalent platinum atoms.

The "atomically thin surface layer" is a layer of zerovalent platinum atoms of sub-monoatomic, monoatomic, diatomic, or triatomic thickness, or any combination thereof. A layer of monoatomic thickness of platinum atoms, i.e., an atomic monolayer, is a single layer of close-packed platinum atoms on the palladium or palladium-alloy substrate particle surface. An atomic monolayer has a surface packing parameter of 1.

A layer of sub-monoatomic thickness, i.e., an atomic sub-monolayer, is a layer of platinum atoms which is less dense than an atomic monolayer (i.e., not close-packed). Accordingly, an atomic submonolayer has a surface packing parameter of less than 1. For example, a surface packing parameter of 0.5 indicates half the density of platinum atoms as compared to a platinum atomic monolayer.

A layer of diatomic thickness refers to a bilayer (two-atom thick) of zerovalent platinum atoms. A layer of triatomic thickness refers to a trilayer (three-atom thick) of zerovalent platinum atoms.

In one embodiment, an atomic submonolayer of platinum contains only platinum atoms in the absence of other co-deposited metal atoms.

In another embodiment, an atomic submonolayer of platinum atoms includes one or more co-deposited atomic submonolayers of another metal to form a platinum alloy monolayer. The co-deposited metal(s) in the platinum alloy monolayer may be, for example, a main group, transition, lanthanide, or actinide metal.

The co-deposited metal(s) in a platinum alloy monolayer provide such advantages as, for example, further reduction in platinum loading as compared to a pure platinum monolayer, reduction in catalytic poisoning, and/or enhancement of catalytic activity. For example, some metals, particularly some of the transition metals, have the ability to adsorb hydroxyl groups (OH). Hydroxyl groups are known to inhibit the oxygen-reducing catalytic activity of platinum. Therefore, particularly when applied as fuel cell catalysts, the co-depositing metal is more preferably a metal known to adsorb OH, e.g., iridium (Ir), ruthenium (Ru), osmium (Os), rhenium (Re), and combinations thereof.

The ratio of co-deposited metal to platinum in such a platinum alloy monolayer is not particularly limited. For example, such a platinum alloy monolayer may be a binary alloy according to the formula $M_xPt_{1-x}$, (1), wherein M is any of the metals described above.

In formula (1), the value of x is not particularly limited. Preferably, x has a minimum value of about 0.01, more preferably 0.05, and even more preferably 0.1. Preferably, x has a maximum value of about 0.99, more preferably a value of about 0.9, more preferably a value of about 0.6, and even more preferably, a maximum value of about 0.5. In a preferred embodiment, x has a value of about 0.2.

Some more specific platinum binary alloy monolayers of formula (1) are represented by the formulas $Ir_xPt_{1-x}$, $Ru_xPt_{1-x}$, $Os_xPt_{1-x}$, or $Re_xPt_{1-x}$. Some specific examples of platinum binary alloy monolayers include $Ir_{0.01}Pt_{0.99}$, $Ir_{0.1}Pt_{0.9}$, $Ir_{0.2}Pt_{0.8}$, $Ir_{0.3}Pt_{0.7}$, $Ir_{0.5}Pt_{0.5}$, $Ir_{0.7}Pt_{0.3}$, $Ir_{0.8}Pt_{0.2}$, $Ir_{0.9}Pt_{0.1}$, $Ir_{0.95}Pt_{0.05}$, $Ru_{0.3}Pt_{0.99}$, $Ru_{0.1}Pt_{0.9}$, $Ru_{0.2}Pt_{0.8}$, $Ru_{0.3}Pt_{0.7}$, $Ru_{0.5}Pt_{0.5}$, $Ru_{0.7}Pt_{0.3}$, $Ru_{0.8}Pt_{0.2}$, $Ru_{0.9}Pt_{0.1}$, $Ru_{0.95}Pt_{0.05}$, $Os_{0.2}Pt_{0.8}$, $Os_{0.5}Pt_{0.5}$, $Os_{0.7}Pt_{0.3}$, $Os_{0.8}Pt_{0.2}$, $Os_{0.9}Pt_{0.1}$, $Re_{0.2}Pt_{0.8}$, $Re_{0.5}Pt_{0.5}$, $Re_{0.7}Pt_{0.3}$, $Re_{0.8}Pt_{0.2}$, and $Re_{0.9}Pt_{0.1}$.

The platinum alloy monolayer may additionally be a ternary alloy. For example, the platinum alloy monolayer may be a ternary alloy according to the formula $M_xN_yPt_{1-x-y}$ (2). In formula (2), M and N are independently any of the suitable metals described above. The values of x and y are not particularly limited. By the rules of chemistry, the sum of x and y in formula (2) must be less than 1. For example, x and y may independently have a value of about 0.01 to a value of about 0.99, as long as the sum of x and y is less than 1.0. More preferably, the sum of x and y has a minimum value of about 0.1 and a maximum value of about 0.9.

Some more specific platinum ternary alloy monolayers of formula (2) are represented by the formulas $Ir_xRu_yPt_{1-x-y}$, $Ir_xOs_yPt_{1-x-y}$, $Ir_xRe_yPt_{1-x-y}$, $Os_xRu_yPt_{1-x-y}$, $Re_xRu_yPt_{1-x-y}$, and $Re_xOs_yPt_{1-x-y}$. Some specific examples of ternary platinum-metal alloy monolayers include $Ir_{0.01}Ru_{0.01}Pt_{0.98}$, $Ir_{0.1}Ru_{0.1}Pt_{0.8}$, $Ir_{0.2}Ru_{0.1}Pt_{0.7}$, $Ir_{0.1}Ru_{0.2}Pt_{0.7}$, $Ir_{0.3}Ru_{0.1}Pt_{0.6}$, $Ir_{0.5}Ru_{0.1}Pt_{0.4}$, $Ir_{0.01}Os_{0.01}Pt_{0.98}$, $Ir_{0.1}Os_{0.1}Pt_{0.8}$, $Ir_{0.2}Os_{0.1}Pt_{0.7}$, $Ir_{0.1}Os_{0.2}Pt_{0.7}$, $Ir_{0.01}Re_{0.01}Pt_{0.98}$, $Ir_{0.1}Re_{0.1}Pt_{0.8}$, $Ir_{0.2}Re_{0.1}Pt_{0.7}$, and $Ir_{0.1}Re_{0.2}Pt_{0.7}$.

The platinum alloy monolayer may additionally be a quaternary alloy. For example, the platinum alloy monolayer may be a quaternary alloy according to the formula $M_xN_yT_zPt_{1-x-y-z}$ (3). In formula (3), M, N, and T are independently any of the suitable metals described above. The values of x, y, and z are not particularly limited. By the rules of chemistry, the sum of x, y, and z in formula (3) must be less than 1. For example, x, y, and z may independently have a value of about 0.01 to a value of about 0.99 as long as the sum of x, y, and z is less than 1.0. More preferably, the sum of x, y, and z has a minimum value of about 0.1 and a maximum value of about 0.9.

Some more specific platinum quaternary alloy monolayers of formula (3) are represented by the formulas $Ir_xRu_yRe_zPt_{1-x-y-z}$ or $Ir_xRu_yOs_zPt_{1-x-y-z}$. Some specific examples of quaternary platinum alloy monolayers include $Ir_{0.01}Ru_{0.01}Re_{0.01}Pt_{0.97}$, $Ir_{0.1}Ru_{0.1}Re_{0.1}Pt_{0.7}$, $Ir_{0.2}Ru_{0.1}Os_{0.1}Pt_{0.6}$, and $Ir_{0.1}Ru_{0.2}Os_{0.1}Pt_{0.6}$.

In a preferred embodiment, the atomically thin layer of platinum atoms covers the entire surface of the palladium or palladium-alloy substrate particle. In another embodiment, the atomically thin layer of platinum atoms covers a portion of the palladium or palladium-alloy substrate particle. For example, the atomically thin layer of platinum surface atoms may be characterized as interconnected islands with some regions of monoatomic, diatomic, or triatomic depth.

One embodiment relates to platinum-coated palladium particles. The platinum-coated palladium particles contain a core composed of palladium atoms in the zerovalent oxidation state.

Another embodiment relates to platinum-coated palladium-alloy particles. The platinum-coated palladium-alloy particles contain a core composed of palladium-alloy. The palladium-alloy core is composed of zerovalent palladium atoms and an alloying component.

The alloying component in the palladium-alloy core may be any chemical or chemicals capable of combining with palladium that do not include platinum or palladium. For example, the alloying component may be carbon, silicon, silicon oxide, a metal, a polymer or polymer end-product, a dendrimer, a natural-based product such as cellulose, and so on.

Preferably, the alloying component in the palladium-alloy core is a metal or combination of metals not including palladium. For example, the metal in the palladium-alloy may be an alkali, alkaline earth, main group, transition, lanthanide, or actinide metal.

More preferably, the alloying metal or metals in the palladium-alloy core are transition metals. Even more preferably, the alloying component is one or more 3d transition metals, particularly nickel (Ni), cobalt (Co), and/or iron (Fe). Gold (Au), or its combination with other metals, particularly, Ni, Co, and Fe, are other preferred alloying components.

The palladium-alloy core in the platinum-coated palladium-alloy particles can be in a homogeneous form. A homogeneous palladium-alloy composition is a form in which the palladium and the alloying component(s) are distributed uniformly on a molecular level throughout the particle. Some examples of homogeneous palladium-alloy compositions include 50:50 Pd—Ni, 80:20 Pd—Ni, 40:60 Pd—Ni, 60:40 Pd—Co, 30:70 Pd—Co, 70:30 Pd—Fe, 60:20:20 Pd—Ni—Co, 40:40:20 Pd—Ni—Fe, 90:5:5 Pd—Fe—Co, 60:20:10:10 Pd—Ni—Co—Fe, 50:50 Pd—Au, 80:20 Pd—Au, 20:80 Pd—Au, 10:90 Pd—Au, and 1:99 Pd—Au compositions.

Alternatively, the palladium-alloy core is in a heterogeneous form. A heterogeneous palladium-alloy composition is a form in which the palladium and the alloying component(s) are distributed with varying composition, i.e., non-uniformly, in the palladium-alloy core. In such cases, there is a palladium component on the surface of the palladium-alloy core.

For example, a heterogeneous palladium-alloy core may have individual palladium grains intermingled with individual cobalt or carbon grains throughout the core; or alternatively, for example, a carbon, cobalt, nickel, iron, copper, ruthenium, gold, or silver sub-core surrounded by a palladium shell. Some other examples of heterogeneous palladium-alloy compositions include a palladium shell on a sub-core of silicon, silicon oxide, silicon nitride, titanium oxide, aluminum oxide, iron oxide, metal salt, latex, carbon, and so on.

In addition, a palladium-alloy core can have a combination of a homogeneous component and a heterogeneous component. An example of such a palladium-alloy core is one that contains a homogeneous sub-core of palladium-alloy coated with a shell of palladium metal. Another example of such a palladium-alloy core is one that contains a homogeneous phase of a palladium-alloy in combination with one or more interlayers of palladium.

The platinum-coated palladium or palladium-alloy particles can have any of several morphologies. For example, the particles can be approximately spherical, cubooctahedral, rod-shaped, cuboidal, pyramidal, amorphous, and so on.

The platinum-coated palladium or palladium-alloy particles can also be in any of several arrangements. The particles may be, for example, agglomerates, micelles, ordered arrays, as a guest in a host such as a zeolite or patterned polymer, and so on.

The size of the platinum-coated palladium or palladium-alloy particles is dependent upon the application, and is thus, not particularly limited. For example, in one embodiment, the size of the particles are a few nanometers to several hundred nanometers, i.e., nanoparticles. In another embodiment, the size of the particles range from hundreds of nanometers to tens or hundreds of microns, i.e., microparticles. In yet another embodiment, the size of the particles range from hundreds of microns to several millimeters in size.

For example, when the platinum-coated composites are applied as heterogeneous catalysts, the size of the particles may be anywhere from a few nanometers to several millimeters in size. When applied as catalysts, the minimum size of the particles is preferably 1 micron, more preferably 500 nanometers, more preferably 100 nanometers, and even more preferably 10 nanometers. The maximum size of the particles is preferably 1 millimeter, more preferably 500 microns, more preferably 100 microns, and even more preferably 10 microns.

When the platinum-coated palladium or palladium-alloy particles of the invention are directed, as oxygen reduction electrocatalysts, as in fuel cells, the particles are preferably nanoparticles. In addition, when used in fuel cells, the size of the nanoparticles is critical. As the size of the nanoparticles decreases, the nanoparticles tend to become increasingly susceptible to oxidation. On the other hand, as the size of the nanoparticles increase, the surface area of the nanoparticles decreases. The decrease in surface area causes a concomitant decrease in catalytic activity and efficiency.

The platinum-coated nanoparticles preferably have a minimum size of about 3 nanometers, and more preferably a minimum size of about 5 nanometers. The platinum-coated nanoparticles preferably have a maximum size of about 500 nanometers, more preferably a maximum size of 100 nanometers, even more preferably a maximum size of about 50 nanometers, and most preferably a maximum size of about 10 nanometers.

Accordingly, in one embodiment, the platinum-coated palladium or palladium-alloy nanoparticles have a minimum size of about 3 nanometers and a maximum size of about 10 nanometers. The maximum size of the platinum-coated nanoparticles is preferably no more than about 12 nanometers. The platinum-coated nanoparticles most preferably have a size of about 5 nanometers.

The platinum-coated palladium and palladium-alloy particles may be in any suitable form. For example, the particles may be in a solid form, such as a powder. The powder may be unsupported or alternatively, bound to a support.

The support may be any suitable support. For example, the support may be carbon, alumina, silica, silica-alumina, titania, zirconia, calcium carbonate, barium sulphate, a zeolite, interstitial clay, and so on.

In some cases, the support is required to be electrically conductive, e.g., when the platinum-coated particle is to be used in a fuel cell. Some examples of electrically conductive supports include carbon black, graphitized carbon, graphite, and activated carbon. The electrically conductive support material is preferably finely divided.

The platinum-coated palladium and palladium-alloy particles may also be suspended or dispersed in a liquid phase. The liquid phase may be any suitable liquid phase. For example, the liquid phase may be aqueous-based. The aqueous-based liquid phase may be completely water, or may include another suitable solvent. For example, the aqueous-based liquid phase may be a water-alcohol mixture.

Alternatively, the liquid phase may include an organic solvent. Some examples of suitable organic solvents include acetonitrile, dimethylsulfoxide, dimethylformamide, toluene, methylene chloride, chloroform, hexanes, glyme, diethyl ether, and the like.

The platinum-coated palladium or palladium-alloy particles may have on their surface some trace chemicals. Some examples of trace chemicals include oxides, halogens, carbon monoxide, and so on, as long as such trace chemicals do not obviate the intended use of the particle. For example, for use in fuel cells, it is preferred that the platinum-coated palladium or palladium-alloy particles do not contain surface oxides and carbon monoxide.

The platinum-coated palladium or palladium-alloy particles may also include, when appropriate, any suitable metal-bonding ligands or surfactants bound to, or associated with, the surface of the particles. Some examples of metal-bonding ligands include phosphines, amines, and thiols. Some more specific examples of metal-bonding ligands include trialkylphosphines, triphenylphosphines and derivatives therefrom, diphosphines, pyridines, trialkylamines, diamines such as ethylenediaminetetraacetic acid (EDTA), thiophenol, alkylmercaptans, and alkyleneoxy, ethyleneoxy and poly(ethyleneoxy) derivatives therefrom, and so on. Some examples of surfactants include polyvinylalcohol, polyvinylpyrrolidinone, albumin, polyethyleneglycols, sodium dodecyl sulfate, fatty acid salts, and the like.

The platinum-coated palladium and palladium-alloy particles may be synthesized by various means. Some methods known in the art for synthesizing such particles include reductive chemical methods in a liquid phase, chemical vapor deposition (CVD), thermal decomposition, physical vapor deposition (PVD), reactive sputtering, electrodeposition, laser pyrolysis, and sol gel techniques.

In one embodiment, an atomically thin platinum layer is deposited onto palladium or palladium-alloy substrate particles. For example, a solution method for depositing an atomic monolayer coating of platinum on palladium nanoparticles was recently reported. See J. Zhang, et al., "Platinum Monolayer Electrocatalysts For $O_2$ Reduction: Pt Monolayer On Pd(111) And On Carbon-Supported Pd Nanoparticles", *J. Phys. Chem. B.*, 108: 10955 (2004). The latter reference is incorporated herein by reference in its entirety.

The method disclosed in Zhang et al. involves first, the electrodeposition of an atomic monolayer of an underpotentially deposited metal, such as copper, onto palladium nanoparticles. The electrodeposition is followed by contact with a platinum salt to initiate a spontaneous redox displacement of the copper atomic monolayer by a platinum atomic monolayer. The atomic monolayer of copper may be displaced by platinum by, for example, immersing the copper-coated palladium nanoparticles into a solution containing a platinum salt, for example, $K_2PtCl_4$. Other metals and mixtures of metals may be similarly co-deposited by contacting the copper-coated palladium nanoparticles with their corresponding salts, e.g., $IrCl_3$, $RuCl_3$, $OsCl_3$, $ReCl_3$, and combinations thereof.

In another embodiment, a platinum-containing vapor or plasma is contacted with palladium or palladium-alloy particles to deposit a layer of platinum onto the particles. Alternatively, a vapor or plasma containing palladium is first allowed to condense to form nanoparticles of palladium. The nanoparticles of palladium are subsequently contacted with a platinum-containing vapor or plasma to deposit a layer of platinum onto the palladium nanoparticles.

In another embodiment, the invention relates to a catalyst. The catalyst includes the platinum-coated palladium and palladium-alloy particles as thus far described. In one embodiment, the platinum-coated particles in the catalyst are bound to a support. In another embodiment, the platinum-coated particles in the catalyst are not bound to a support.

One class of catalysis reactions for which the platinum-coated palladium and palladium-alloy particles are applicable includes hydrogenation and dehydrogenation reactions of hydrocarbons. Another class of applicable catalysis reactions includes carbon-carbon cross-coupling reactions. Yet another class of applicable catalysis reactions includes hydrosilylation reactions.

In yet another embodiment, the invention relates to a fuel cell. The fuel cell includes an oxygen-reducing cathode having the platinum-coated palladium and palladium-alloy particles described above bound to an electrically conductive support. The oxygen-reducing cathode is in electrical contact with an anode, and both oxygen-reducing cathode and anode are in chemical contact through an ion-conducting medium. The fuel cell, as described, becomes operational when the oxygen-reducing cathode is in contact with oxygen gas and the anode is in contact with a fuel source.

Oxygen gas may be supplied to the oxygen-reducing cathode in the form of pure oxygen gas. More preferably, the oxygen gas is supplied as air. Alternatively, oxygen gas may be supplied as a mixture of oxygen and one or more other inert gases. For example, oxygen may be supplied as oxygen-argon or oxygen-nitrogen mixtures.

Some contemplated fuel sources include, for example, hydrogen gas and alcohols. Some examples of suitable alcohols include methanol and ethanol. The alcohol may be unreformed or reformed. An example of a reformed alcohol is methanol reformate. Examples of other fuels include methane, gasoline, formic acid, and ethylene glycol. The gasoline or methane is preferably reformed to produce fuel more suitable for existing fuel cells.

Preferably, the ion-conducting medium is a proton-conducting medium, i.e., a medium that conducts only protons and separates the fuel and oxygen gas. The proton-conducting medium may be in any of several suitable forms, for example, a liquid, solid, or semi-solid. A preferred proton-conducting membrane is the perfluorinated polymer NAFION®.

The anode of the fuel cell may be any of the anodes known in the art. For example, the anode may be supported or unsupported platinum or platinum-alloys. The anode may also include a carbon monoxide tolerant electrocatalyst. Such carbon monoxide tolerant anodes include numerous platinum alloys. A notable carbon monoxide tolerant anode containing an atomically thin layer of platinum on ruthenium nanoparticles has been disclosed by Adzic et al. (U.S. Pat. No. 6,670, 301 B2). The foregoing patent by Adzic et al. is included herein by reference in its entirety.

In yet another embodiment, the invention relates to a method for reducing oxygen gas. In one embodiment, the method uses the platinum-coated palladium and palladium-alloy particles described above to reduce oxygen gas. When reducing oxygen, the platinum-coated particles may be in the form of, for example, an unsupported powdery or granular solid, or alternatively, an unsupported dispersion or suspension in a liquid phase. The particle composites may alternatively be bound to a support when reducing oxygen gas.

In a further embodiment, the invention relates to a method for producing electrical energy. The method for producing electrical energy includes the combined use of elements typically used in a fuel cell, i.e., a fuel-oxidizing anode, oxygen-reducing cathode, ion-conducting medium, and fuel source. The oxygen-reducing cathode includes the platinum-coated nanoparticles of the invention. The oxygen-reducing cathode is in electrical contact with the anode, and both cathode and anode are in chemical contact through the ion-conducting medium. Electrical energy is produced when the cathode is in contact with oxygen gas and the anode is in contact with the fuel source.

Examples have been set forth below for the purpose of illustration and to describe the best mode of the invention at the present time. However, the scope of this invention is not to be in any way limited by the examples set forth herein.

EXAMPLE 1

Preparation of Platinum-Coated Palladium Nanoparticle Composites

The platinum-coated palladium nanoparticle composites of the present invention were prepared by depositing atomically thin platinum layers on palladium nanoparticles by redox displacement by platinum of an adlayer of an underpotentially deposited (upd) metal on a palladium nanoparticle substrate. In this example, copper was used as the underpotentially deposited metal on a palladium nanoparticle substrate.

To prepare an electrode with Pd nanoparticles, a dispersion of palladium nanoparticles on carbon substrate (Pd/C) was made by sonicating the Pd/C nanoparticles in water for about 5-10 minutes to make a uniform suspension. The carbon substrate used was Vulcan XC-72. Then, 5 microliters of this suspension was placed on a glassy carbon disk (GC) electrode and dried in air.

The GC electrode holding the Pd/C nanoparticles was then placed in a 50 mM $CuSO_4$/0.10 M $H_2SO_4$ solution to electrodeposit copper. After electrodeposition of the copper monolayer, the electrode was rinsed to remove copper ions from the electrode. The electrode was then placed in an aqueous solution containing 1.0 mM $K_2PtCl_4$ in 50 mM $H_2SO_4$ in a nitrogen atmosphere. After a 1-2 minute immersion to completely replace copper by platinum, the electrode was rinsed again. The deposition of an atomic monolayer of platinum on palladium nanoparticles was verified by voltammetry and by Auger electron spectroscopy (AES). The same process was done with a Pd(111) single crystal electrode and verified by scanning tunneling microscopy (STM) using a Molecular Imaging Pico STM with a 300S Pico Bipotentiostat. The cell was made of Teflon, and STM tips were prepared from 80:20 Pt/Ir wire, insulated with Apiezon.

EXAMPLE 2

Electrocatalytic Activity Measurements of Platinum Monolayer-Coated Palladium Nanoparticles The oxygen reduction electrocatalytic activity of the platinum-coated palladium nanoparticle composites of the present invention (denoted as Pt/Pd) was compared to the electrocatalytic activity of palladium (Pd) and platinum (Pt) nanoparticle catalysts by measuring polarization curves using a rotating disk electrode operating at 1600 rpm (see FIG. 1). In the polarization curve of FIG. 1, Pd 10/C and Pd 20/C refer to palladium loading concentrations of 10 nmol and 20 nmol on carbon support, respectively. Pt 10/C refers to a platinum loading of 10 nmol. The Pd 10/C curve was measured on palladium nanoparticles of 9 nm size; the Pt 10/C curve was measured on platinum nanoparticles of 3.1 nm size; the Pt/Pd 10/C and 20/C curves were measured on nanoparticle composites of 9 nm size.

As shown by the polarization curves in FIG. 1, the activity of Pt/Pd 10/C is much higher than that of Pd 10/C as indicated by a positive shift of the half-wave potential of 120 mV. For Pt/Pd 10/C, the actual Pt loading is about 1.5 nmol as compared to 10 nmol in Pt 10/C. Yet, significantly, and unexpectedly, the activity of Pt/Pd 10/C is about 25 mV higher in half-wave potential than that of Pt 10/C. The Pt/Pd 20/C nanoparticles had the highest activity, mainly due to the increased platinum surface area. The higher activity of the platinum-coated palladium nanoparticles of the present invention as compared with those of Pt and Pd nanoparticles indicate a synergistic effect between Pd and Pt in the platinum-coated palladium nanoparticles. The synergistic effect found in the nanoparticles of the present invention allows significantly smaller loading of platinum (at least seven times lower) along with significantly increased electrocatalytic activity.

Figure 2:
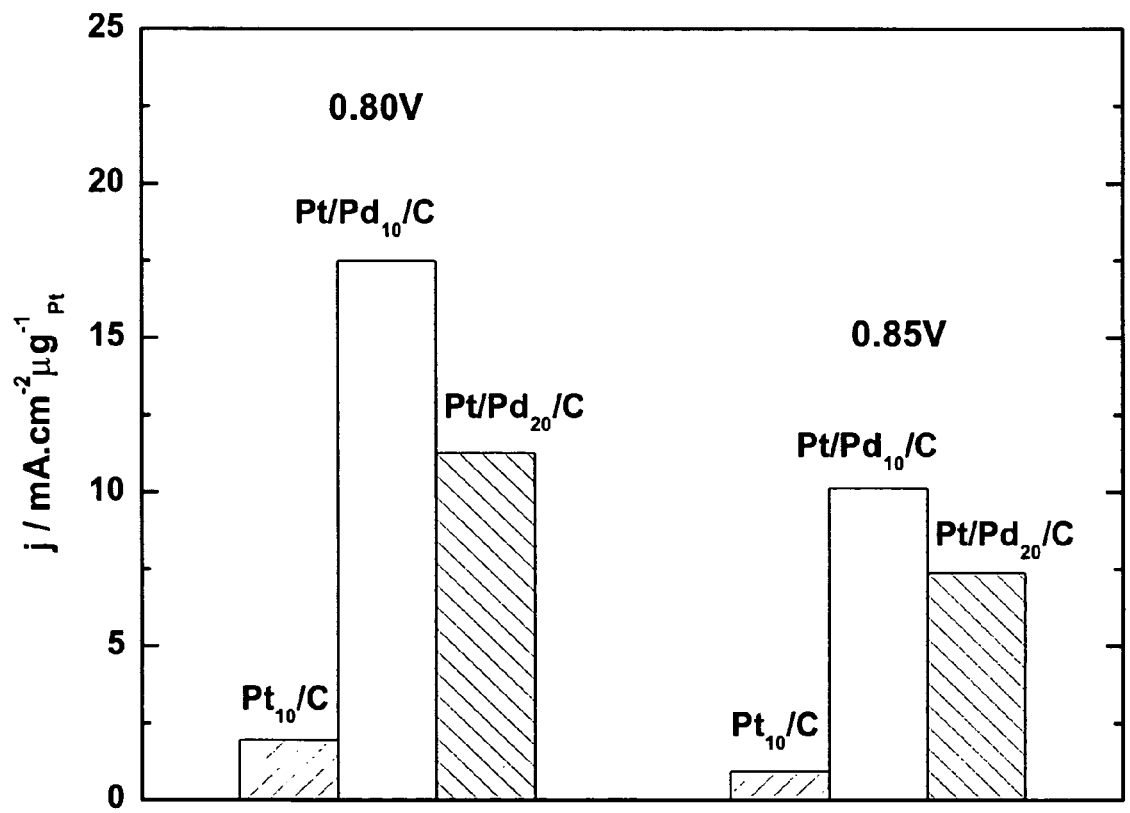
FIG. 2. Comparison of Pt mass-specific activities of platinum nanoparticles (10 nmol Pt loading) and platinum-coated palladium nanoparticles of the present invention (1.3 and 2.4 nmol Pt loading, left and right sets of bars, respectively) on palladium nanoparticles (10 and 20 nmol Pd loadings).

In addition to the polarization curves, a useful way of comparing the activities of various electrocatalysts is by comparing their mass-specific activities. FIG. 2 compares the Pt mass-specific activities of platinum nanoparticles of 10 nmol Pt loading, i.e., $Pt_{10}$/C, and palladium nanoparticles coated with a monolayer of platinum atoms ($Pt/Pd_{10}$/C and $Pt/Pd_{10}$/C). The left set of bars correspond to 1.3 nmol Pt loading. The right set of bars correspond to 2.4 nmol Pt loading. FIG. 2 shows that the platinum monolayer-coated palladium nanoparticles of the present invention have five to eight times greater activity than the platinum nanoparticles.

Figure 5:
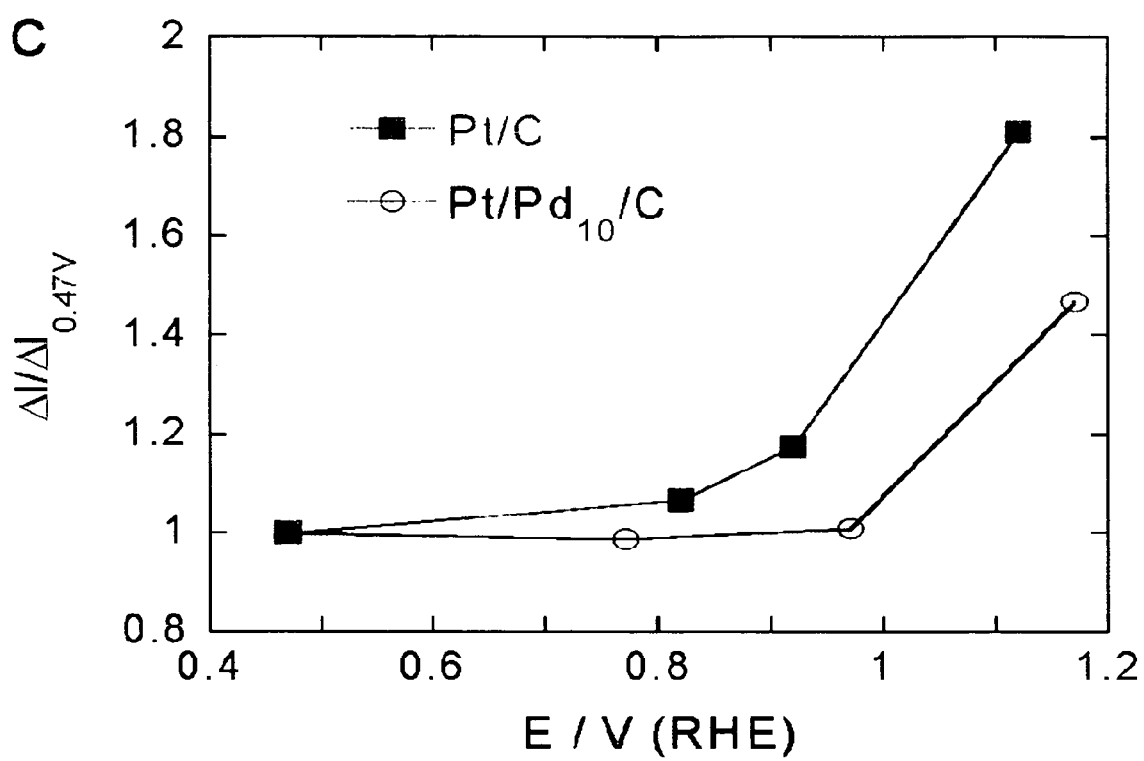
FIG. 5. X-ray spectroscopy absorption peak of Pt—OH formation as a function of potential for Pt monolayer on palladium nanoparticles and Pt monolayer on carbon.

It has also been found that the degree of platinum oxidation in the form of Pt—OH formation is significantly reduced in platinum monolayers on palladium nanoparticles as compared to platinum on carbon (see FIG. 5). In FIG. 5, the change in the XANES X-ray absorption peak for Pt—OH formation was plotted at four different potentials in 1M $HClO_4$ for Pt monolayer on palladium nanoparticles and Pt monolayer on carbon. The change in absorption from upper absorption baseline to absorption peak at a particular voltage is designated $\Delta I$. The change in absorption from upper absorption baseline to absorption peak at 0.47V is designated $\Delta I_{0.47V}$. The ratio $\Delta I/\Delta I_{0.47V}$ corresponds to the tendency of the platinum coat to oxidize at potentials greater than 0.47V. The plot of $\Delta I/\Delta I_{0.47V}$ against potential shows that the tendency for Pt monolayer-coated palladium nanoparticles to oxidize at higher potentials than 0.47V is significantly less than the tendency of platinum on carbon to oxidize at such potentials.

EXAMPLE 3

Figure 3:
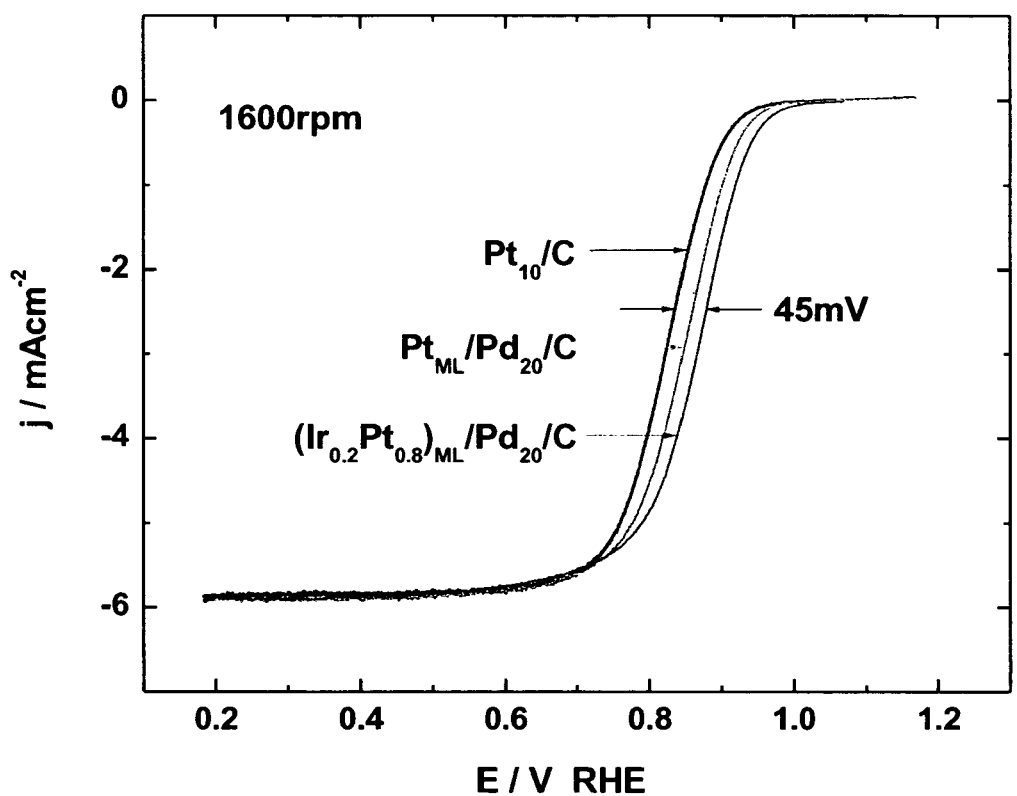
FIG. 3. Comparison of polarization curves for oxygen reduction on commercial platinum nanoparticles, 10 nmol loading (left curve); platinum-coated palladium nanoparticles of the present invention, 20 nmol Pd loading (middle curve), and $Ir_{0.2}Pt_{0.8}$-coated palladium nanoparticles of the present invention (right curve).

Electrocatalytic Activity Measurements of Platinum-Iridium and Platinum-Ruthenium Alloy Monolayers on Palladium Nanoparticles The oxygen reduction electrocatalytic activity of monolayers of platinum-iridium alloy on palladium nanoparticles having 20 nmol Pd loading, i.e., $(Ir_{0.2}Pt_{0.8})_{ML}/Pd_{20}/C$, was compared to the electrocatalytic activity of monolayers of platinum on palladium nanoparticles having 20 nmol Pd loading, i.e., $Pt_{ML}/Pd_{20}/C$, and to commercial platinum nanoparticle catalysts having 10 nmol Pt loading, i.e., $Pt_{10}/C$, by measuring polarizations using a rotating disk electrode operating at 1600 rpm (see FIG. 3). In the polarization curve of FIG. 3, $(Ir_{0.2}Pt_{0.8})_{ML}/Pd_{20}/C$ has a half-wave potential 45 mV higher than commercial $Pt_{10}/C$, which corresponds to a significantly higher activity than commercial $Pt_{10}/C$. In addition, $(Ir_{0.2}Pt_{0.8})_{ML}/Pd_{20}/C$ is shown to have a higher activity than $Pt_{ML}/Pd_{20}/C$, as evidenced in its higher polarization of 20 mV as compared to $Pt_{ML}/Pd_{20}/C$. The increased activity is believed to be a consequence of a decrease in OH adsorption imparted by the Ir alloying component.

Figure 4:
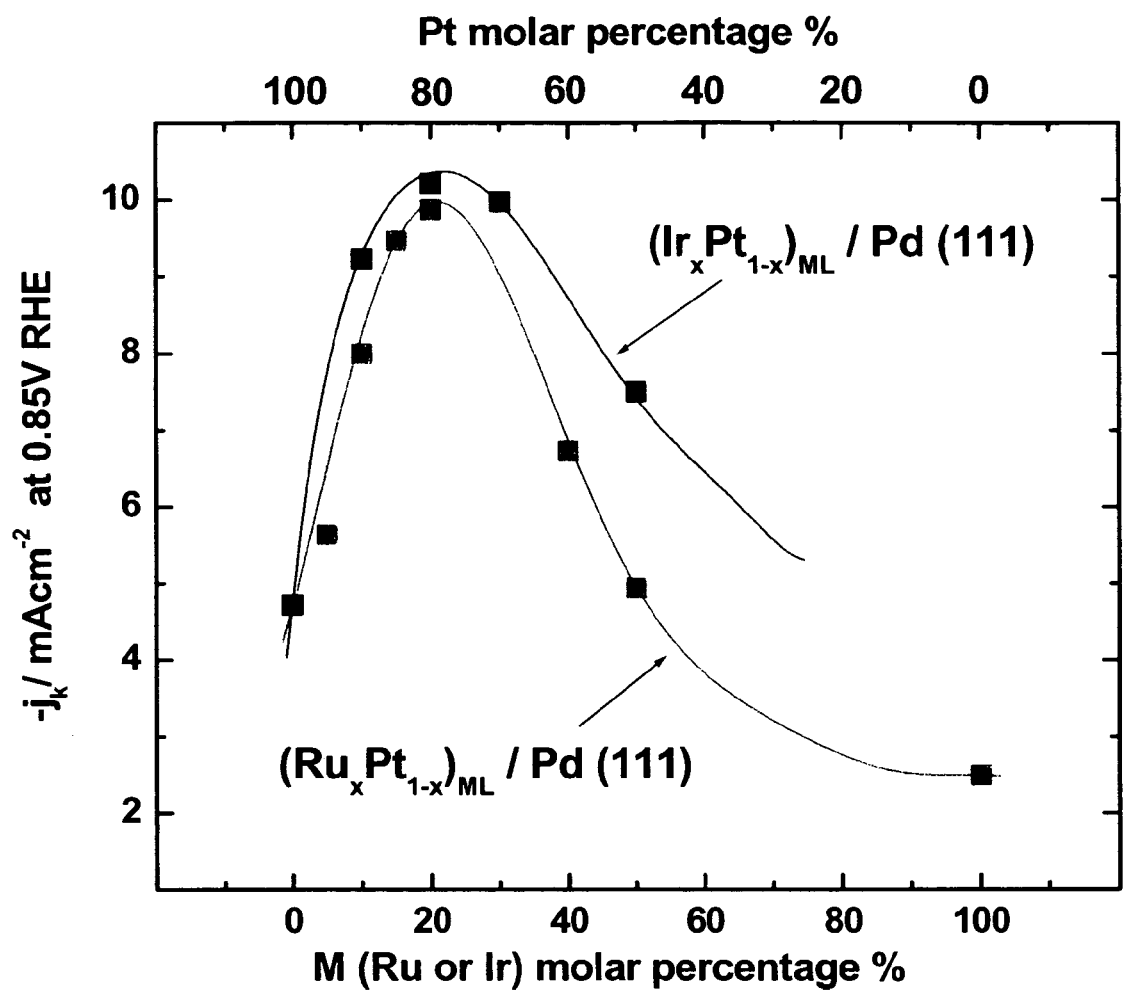
FIG. 4. Comparison of the activities of $Ir_xPt_{1-x}$-coated and $Ru_xPt_{1-x}$-coated palladium nanoparticles of the present invention as a function of molar ratio x at 0.8V.

In addition, the activities of monolayers of two platinum alloy series $Ir_xPt_{1-x}$ and $Ru_xPt_{1-x}$ on a Pd(111) electrode were tested by measuring currents at 0.8V while varying the molar ratio x from approximately 0 to approximately 1 (see FIG. 4). As shown by FIG. 4, the maximum activity is observed when x is approximately 0.1 to 0.3. The highest activity is observed when x is approximately 0.2, which corresponds to alloy formulations of $Ir_{0.2}Pt_{0.8}$ and $Ru_{0.2}Pt_{0.8}$.

Thus, whereas there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

The invention claimed is:

1. A particle composite comprising a palladium-alloy particle coated with a layer selected from the group consisting of an atomic submonolayer, monolayer, bilayer, or trilayer of zerovalent platinum atoms, or a combination thereof, wherein said palladium-alloy does not include platinum.

2. A particle composite according to claim 1, wherein said palladium-alloy particle is a palladium-alloy nanoparticle.

3. A particle composite according to claim 2, wherein said palladium-alloy nanoparticle is comprised of a homogeneous combination of palladium and an alloying metal.

4. A particle composite according to claim 3, wherein the alloying metal is a transition metal.

5. A particle composite according to claim 4, wherein the transition metal is a 3d transition metal.

6. A particle composite according to claim 4, wherein the transition metal is iron, cobalt, nickel, gold, or a combination thereof.

7. A particle composite according to claim 2, wherein said palladium-alloy nanoparticle is comprised of a heterogeneous combination of palladium and an alloying metal.

8. A particle composite according to claim 7, wherein said heterogeneous combination is comprised of an inner core of alloying metal coated with a layer of palladium.

9. A particle composite comprising:
a palladium or palladium-alloy particle coated with a layer selected from the group consisting of an atomic submonolayer, monolayer, bilayer, or trilayer of zerovalent platinum atoms, or a combination thereof, wherein said palladium-alloy does not include platinum; and
metal-bonding ligands or surfactants on said surface layer of zerovalent platinum.

10. A particle composite according to claim 2, wherein the palladium-alloy nanoparticle has a size of about three to ten nanometers.

11. A particle composite comprising:
a palladium or palladium-alloy particle coated with a layer selected from the group consisting of an atomic submonolayer, monolayer, bilayer, or trilayer of zerovalent platinum atoms, or a combination thereof, wherein said palladium-alloy does not include platinum; and
wherein the palladium or palladium-alloy nanoparticle has a size of about five nanometers.

12. A particle composite, comprising:
a palladium or palladium-alloy particle coated with a layer selected from the group consisting of an atomic submonolayer, monolayer, bilayer, or trilayer of zerovalent platinum atoms, or a combination thereof, wherein said palladium-alloy does not include platinum; and
wherein the palladium or palladium-alloy particle is coated with an atomic submonolayer of zerovalent platinum atoms.

13. A particle composite according to claim 12, wherein the atomic submonolayer of zerovalent platinum atoms is co-deposited with a submonolayer of a metal other than platinum to form a platinum-metal alloy monolayer.

14. A particle composite according to claim 13, wherein the metal other than platinum is a transition metal.

15. A particle composite according to claim 14, wherein the transition metal is Ir, Ru, Os, or Re.

16. A particle composite according to claim 15, wherein said platinum-metal alloy monolayer is according to the formula $Ir_{0.2}Pt_{0.8}$.

17. A particle composite according to claim 15, wherein said platinum-metal alloy monolayer is according to the formula $Ru_{0.2}Pt_{0.8}$.

18. A particle composite according to claim 15, wherein said platinum-metal alloy monolayer is according to the formula $Os_{0.2}Pt_{0.8}$.

19. A particle composite according to claim 15, wherein said platinum-metal alloy monolayer is according to the formula $Re_{0.2}Pt_{0.8}$.

20. A suspension or dispersion comprising a particle composite suspended or dispersed in a liquid phase, wherein said particle composite comprises a palladium or palladium-alloy particle coated with a layer selected from the group consisting of an atomic submonolayer, monolayer, bilayer, or trilayer of zerovalent platinum atoms, or a combination thereof, wherein said palladium-alloy does not include platinum.

21. A catalyst comprising a particle composite comprising a palladium or palladium-alloy particle coated with a layer selected from the group consisting of an atomic submonolayer, monolayer, bilayer, or trilayer of zerovalent platinum atoms, or a combination thereof, wherein said palladium-alloy does not include platinum, wherein said particle composite is bound to a support.

22. A catalyst according to claim 21, wherein the support is electrically conductive.

23. A catalyst according to claim 22, wherein the support is carbon black, graphitized carbon, graphite, or activated carbon.

24. A method for reducing oxygen gas, the method comprising contacting a nanoparticle composite comprising a palladium or palladium-alloy nanoparticle coated with a layer selected from the group consisting of an atomic submonolayer, monolayer, bilayer, or trilayer of zerovalent platinum atoms, or a combination thereof, wherein said palladium-alloy does not include platinum, with oxygen gas.

* * * * *